June 19, 1928. 1,673,863
W. S. F. BROWN ET AL
VARIABLE SPEED GEAR
Filed Feb. 4, 1926 4 Sheets-Sheet 1
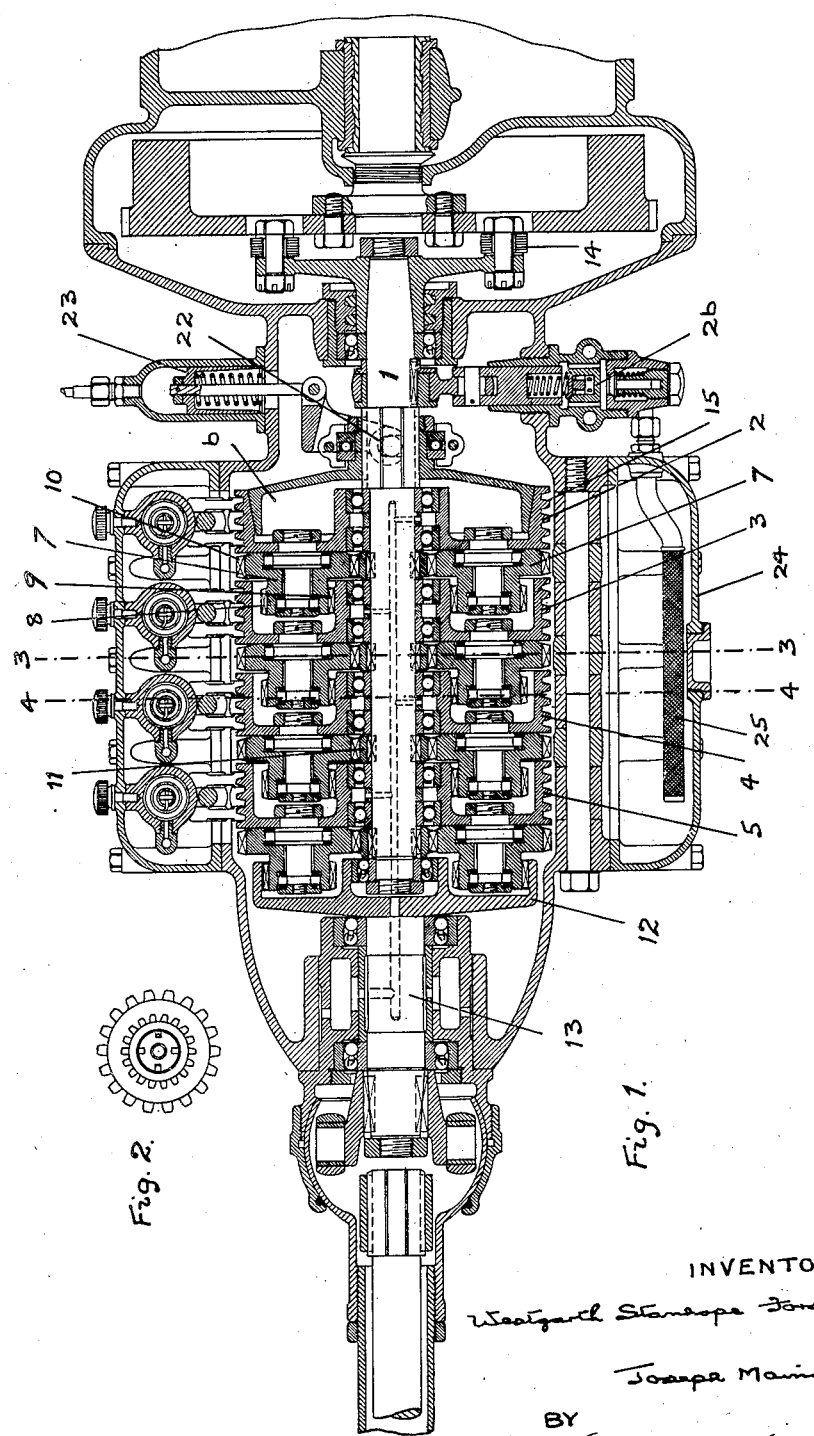

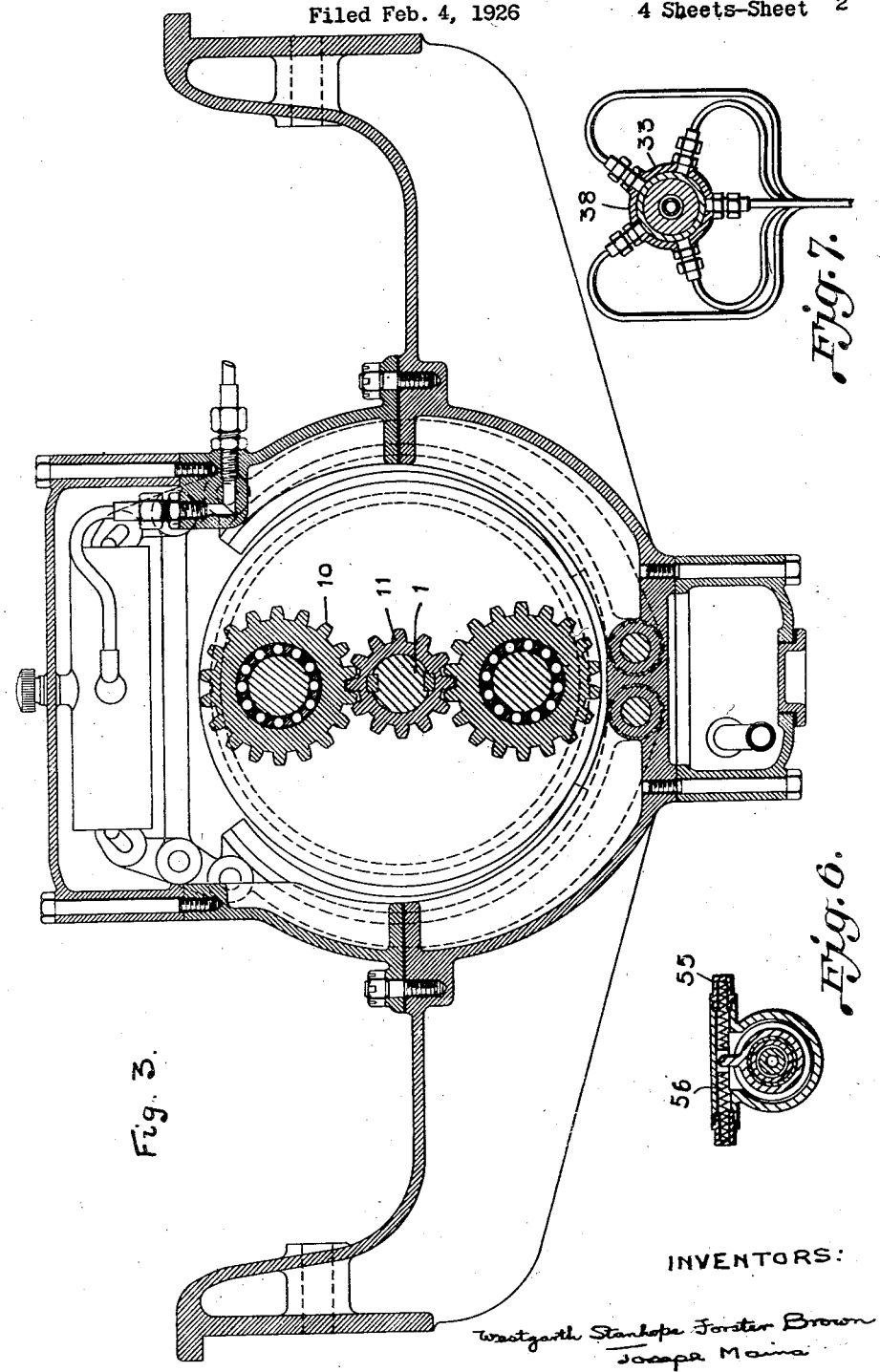

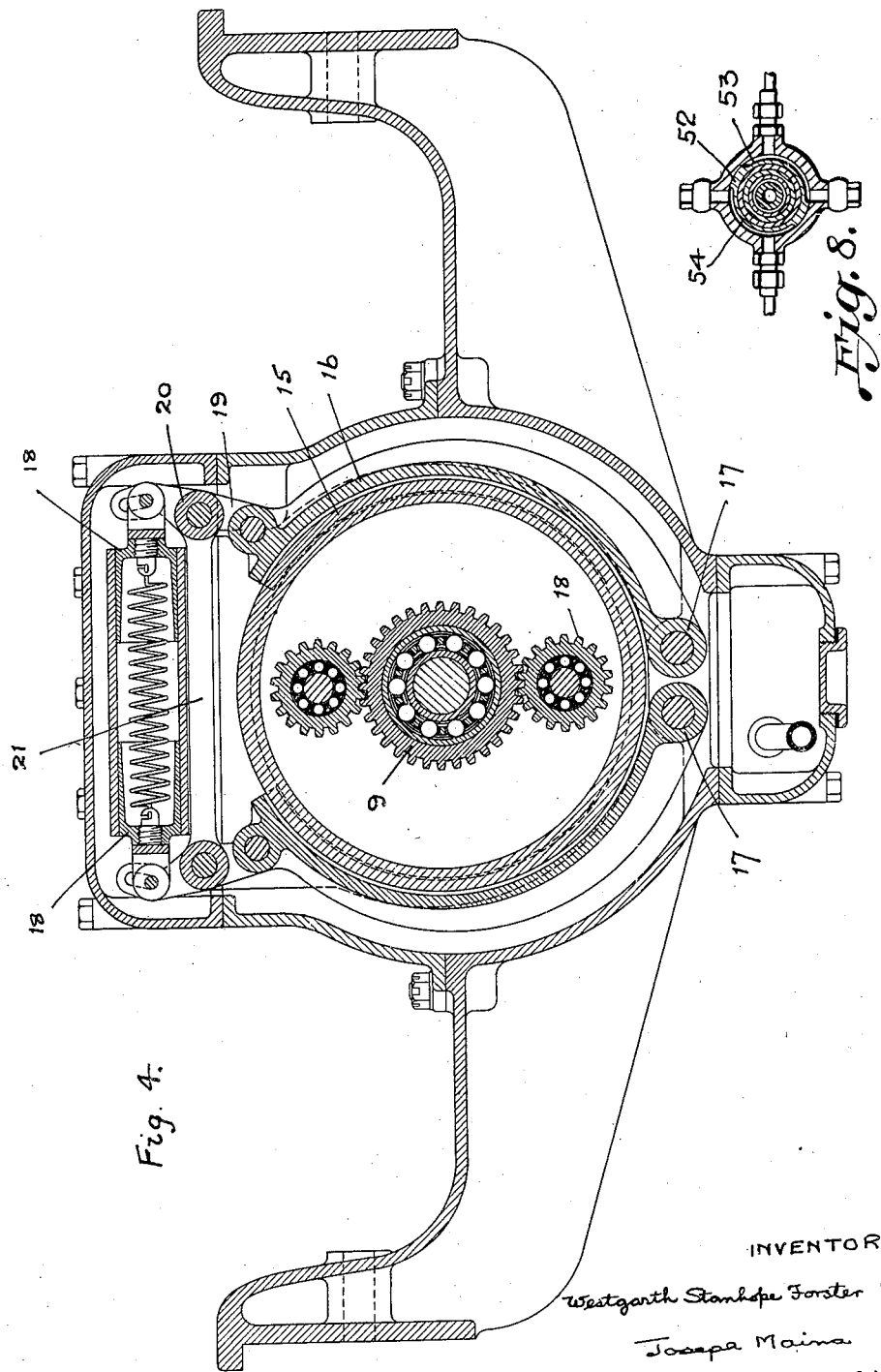

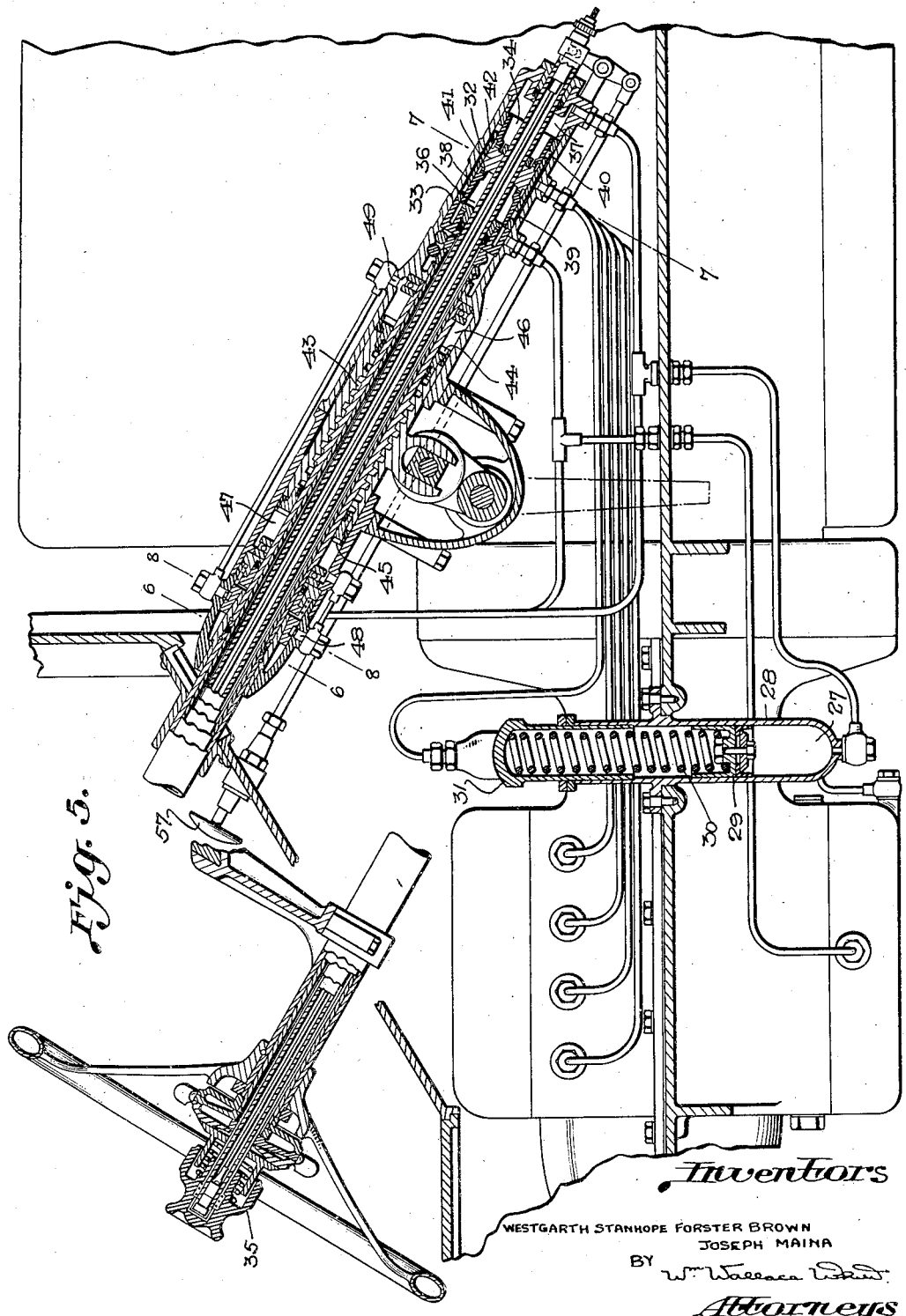

Patented June 19, 1928.

1,673,863

UNITED STATES PATENT OFFICE.

WESTGARTH STANHOPE FORSTER BROWN AND JOSEPH MAINA, OF LONDON, ENGLAND.

VARIABLE-SPEED GEAR.

Application filed February 4, 1926, Serial No. 85,931, and in Great Britain February 5, 1925.

This invention relates to variable speed gears and particularly to variable speed gears of the type in which different speed ratios are obtained by compounding a plurality of epicyclic elements.

According to this invention, we provide a variable speed gear of the type referred to, comprising a primary shaft carrying a plurality of sunwheels hereafter called the primary sun wheels, a plurality of planetary cages hereinafter called controlling members, supported by and adapted to rotate on the primary shaft, and each supporting one or more planetary elements formed with two pinions integral with one another, one of them engaging a primary sun wheel and the other engaging a secondary sun wheel integral with the controlling member or mounted thereon.

A secondary shaft is provided with an internal crown gear internal or mounted on the secondary shaft, meshing with a pinion of the last planetary element. The assembling of the gear is so made that the primary shaft and the secondary shaft are in alignment and the primary shaft is supported at one end by a bearing fitted into the forward end of the casing and at the other by a spigot bearing formed or mounted on the secondary shaft, which secondary shaft is independently supported by two bearings carried by the rear end of the casing.

The drive is obtained by arresting any one of the controlling members by a method explained hereafter.

A gear according to this invention is characterized in that the planetary element is formed of two pinions having the same number of teeth, but of different diametral pitch, the teeth of each pinion being in alignment. The planetary element is preferably constructed of one piece and supported on a pin mounted on the controlling member through roller bearings substantially as described in the specification left with our application Serial No. 44,215 filed in the United States Patent Office July 17, 1925.

The object of the arrangement of the pinions on the planetary element as described above is to avoid noise by ensuring that the teeth of the mating gears, at one instant, are in engagement with the same angular pressure and the line or lines of contact, for the teeth in engagement are parallel to the axis of the shaft at any instant.

The drive is obtained by stopping any one of the controlling members or by locking any one of the controlling members on the primary shaft by means of hydraulic control as follows:—

According to this invention, we operate brake shoes, on drums integral with the controlling members of the gear, and also operate the toggle-fork for the clutch operation for the direct drive, by hydraulic means, the mechanism comprising shoes adapted to be pressed on the drums by a plunger or plungers, the fluid pressure actuating the plunger or plungers being provided by a pump operated mechanically or by hand or pedal.

A single pump is preferably provided and a valve is adapted to transmit the pressure to each of the elements in the braking system. The valve is preferably situated in and/or operated from the hub of the steering wheel, and is provided with a suitable graduated dial. The valve may be adapted to receive a rotary as well as an axial displacement, so that a sequence of openings in the distribution system could be interrupted for the purpose of selecting any particular gear without engaging other gears.

Referring to the accompanying drawings, which illustrate one particular manner of carrying out the invention:

Figure 1 is a longitudinal section;

Fig. 2 is a detailed view of a satellite pinion;

Fig. 3 is a transverse section along 3—3 of Fig. 1;

Fig. 4 is a transverse section along 4—4 of Fig. 1;

Fig. 5 is a view, partly in section, of the controlling device;

Figs. 6, 7 and 8 are detail sectional views along 6—6, 7—7 and 8—8 of Fig. 5.

The gear is designed for four forward and reverse speed, and when in direct drive the gear rotates as a solid block.

The gear consists of four operative trains of gear mounted loose on the primary shaft 1. 2 is the element for the third speed; 3 for the second; 4 for the first, and 5 for the reverse. The operative train 2 is adapted to be engaged with the primary shaft by clutch 6.

Each of the operative trains consists of grooved drum 15, the hub of which is formed with the teeth of a secondary sun wheel 9. Two groups of satellite pinions 7 are mounted on the drum. Each group of satellites has one small pinion 8 and one large pinion 10.

All the satellite groups in all the trains are of the same size and so are the drums. with the exception of the third speed operative train 2 the hub of which remains plain.

All the drums are mounted loose on the primary shaft 1 on which sun wheels 11 are solidly mounted. Each sun wheel 11 is in mesh with each of the large pinions 10, and each small pinion 8 is in mesh with secondary sun wheel 9 of the following train.

The compounding of the several operative trains constitutes the epicyclic gear, the last element of which is related to the secondary shaft by the small pinion 8 and the last group of satellites being in mesh with an internal gear 12 made out of a flanged forging integral with the secondary shaft 13. The secondary shaft is supported independently at the rear of the casing. A flexible joint 14 couples the primary shaft to the fly-wheel of the engine.

Shoes 16 are mounted on pivot bars 17 and are adapted to be pressed on each drum by a set of levers 19 linked by a bar 21 and mounted on bosses 20.

The links or levers 19 are connected to opposed pistons 18, 18 mounted in a cylinder and subject to be expanded by hydraulic pressure. Similarly the clutch 6 is brought into engagement by hydraulic pressure acting on piston 23 and fork 22.

The lubricating oil of the gear is employed as hydraulic medium, and is pumped by pump 26 from the sump 24 through a filter 25 to a mechanical accumulator 27 in which piston 29 moves under pressure of oil in a cylinder 28 against a spring 30 adjustable by a cap 31. The movement of the piston allows a variable volume of oil to be stored, and the spring maintains a more or less constant pressure between 120 and 150 lbs. per square inch, and an automatic by-pass valve returns the surplus oil to the sump.

The piston valve 32 is mounted in cylinder 33 on piston rod 34, which terminates at the top end in the centre of the steering wheel with a knob 35. The cylinder 33 is divided by the piston 32 into two compartments; 36 for the discharge and 37 for the pressure. The discharge communicates by piping with the sump of the gear, and the pressure communicates to the mechanical accumulator. The liner 38 in which the piston fits accurately, is mounted in cylinder 33, and is provided with five holes 39 on the discharge side, and five holes 40 on the pressure side. The holes 39 and 40 lead through a common pipe to the respective operative cylinders of the gear. The arrangement is so designed that when any one operative cylinder is under pressure, all the others communicate with the discharge, and the selection of any one gear is effected by rotating the knob 35, and therefore the piston 32.

Grooves 41 and 42 are provided on the piston valve 32 at the discharge and pressure side, and are so arranged that the axial pull of the piston valve will communicate the whole of the five operative cylinders of the gear with the discharge, thereby causing the gear to be in neutral. Axial push of the piston valve will communicate the whole of the five operative cylinders of the gear with the pressure side, thereby causing the whole of the operative trains to be restrained and acting as a transmission brake.

Contrary to the system adopted by certain epicyclic gear which, in running forward, operates on the reverse element as a transmission brake (although this could also be effected on our gear), we claim that by our method of operating on all the restraining members a very considerable surface is available and the brake, although very powerful is subject to the minimum wear.

A clutch pedal 57 is provided which operates the piston valve 32 and puts the gear in neutral, or alternatively operates an independent valve simultaneously closing or reducing the pressure of oil from the accumulator, while releasing the pressure in the oil supply pump from the accumulator to the valve by connecting the said supply pipe to the discharge.

This system of hydraulic control is independent of any occasional leak that in unusual circumstances might occur through wear of the pistons or of the packing glands, so long as the supply of oil is sufficient and above the minimum pressure in the circuit, this being obtained by the site of the pump adopted.

In connection with this hydraulic system, other mechanism, such as front wheel brake control, shock absorbers, etc., could be inserted into the circuit and connected to the mechanical accumulator; and we think that an improved form of steering gear would be an advantage. Therefore we have embodied in our design a self-assisting steering unit combined with the gear control.

This steering gear is of the worm and nut type The nut block 43 acts as a double-acting piston, the ends of which 44, 45 correspond to cylindrical chambers 46, 47, which are adapted to communicate by valve 52 through holes 48, 49 with the pressure port 53 or the discharge port 54 in such a way that when one end is receiving pressure, the other end is on the discharge, or vice-versa. The valve 52 oscillates left or right against two opposed springs 55, 56, which maintain the valve normally in a position whereby the holes leading to the chambers 46, 47 are closed when the steering gear is set for a straight direction, in which case the oil contained in chambers 46, 47, having no outlet, will act as a damping medium, thereby absorbing the shocks and vibration, and preventing movement of the steering arm and wobbling of the front wheels.

In the act of steering, as the driver begins to rotate the steering mast, the valve 52 through friction of collar 53 oscillates in the same direction, during a short space of time, until one of the compensating springs 55 or 56 brings back the valve into its original intermediate position. During the oscillation phase of the valve 52 pressure is admitted on one side or the other of the nut block 43, and the action of steering is thereby assisted, relieving the driver of the effort of steering.

The worm and nut block arrangement, which is hereby retained, answers an important requirement of security, and is robust, positive, and irreversible.

Gas and ignition control are arranged concentrically around the gear controlling knob. The electric horn control is arranged in the centre of the knob following standard practice, but if preferred a lock could be fitted instead for avoiding tampering.

Having now thus fully described our invention what we claim and desire to secure by Letters Patent is:

1. In variable speed epicyclic gearing, a primary shaft, a secondary shaft, a plurality of operative trains of gear loosely mounted on said primary shaft, a sun-wheel for each train fixed to said shaft, a grooved drum in each gear train, a clutch secured to said primary shaft and adapted to engage the first drum and lock it to said shaft, a secondary sun wheel on each of the remaining drums, one large and one small group of satellite pinions mounted on each of said drums, the arrangement being such that each of the large pinions meshes with one of the fixed sun wheels and each small pinion with the exception of that in the last train meshes with the secondary sun wheel of the following gear train, a flanged member integral with the secondary shaft, an internal gear on said member with which the small pinion of the last train engages, and means for braking any or all of said drums.

2. In variable speed epicyclic gearing, a primary shaft, a secondary shaft, a plurality of operative trains of gear loosely mounted on said primary shaft, a sun wheel for each train fixed to said shaft, a grooved drum in each gear train, a clutch secured to said primary shaft and adapted to engage the first drum and lock it to said shaft, a secondary sun wheel on each of the remaining drums, one large and one small satellite pinion having the same number of teeth but different diametrical pitch mounted on each of said drums, the arrangement being such that each of the large pinions meshes with one of the fixed sun wheels and each small pinion with the exception of that in the last train meshes with the secondary sun wheel of the following gear train, a flanged member integral with the secondary shaft, an internal gear on said member with which the small pinion of the last train engages, and means for hydraulically braking any or all of said drums.

3. In variable speed epicyclic gearing, a plurality of operative trains of gear, a drum in each train, braking means associated with each of said drums, an operative cylinder adapted to control the braking means of each drum, and means for supplying hydraulic pressure to and releasing such pressure from said operative cylinders comprising a pump, means for connecting said pump to the oil sump of the engine, a mechanical accumulator connected to said pump, a cylinder, a grooved piston valve in said cylinder, means for controlling said valve, a pressure compartment on one side of said valve connected to said accumulator, a discharge compartment on the opposite side of said valve connected to said sump, pipe connections between said cylinder and the individual operative cylinders, and a liner having a plurality of openings disposed between said cylinder and valve and adapted to place said pipe connections in communication with either the pressure or the discharge compartments, the arrangement being such that when any one of said operative cylinders is placed in communication with the pressure compartment, all the other operative cylinders communicate with the discharge compartment.

4. In variable speed epicyclic gearing, a plurality of operative trains of gear, a drum in each train, braking means associated with each of said drums, an operative cylinder adapted to control the braking means of each drum, and means for supplying hydraulic pressure to and releasing such pressure from said operative cylinders comprising a pump, means for connecting said pump to the oil sump of the engine, a mechanical accumulator connected to said pump, a cylinder, a grooved piston valve in said cylinder, means for controlling said valve, a pressure compartment on one side of said valve connected to said accumulator, a discharge compartment on the opposite side of said valve connected to said sump, pipe connections between said cylinder and the individual operative cylinders, a liner having a plurality of openings disposed between said cylinder and valve and adapted to place said pipe connections in communication with either the pressure or the discharge compartments, the arrangement being such that when any one of said operative cylinders is placed in communication with the pressure compartment, by the rotation of the valve to a predetermined position, all the other operative cylinders communicate with the discharge compartment, while axial movement of said valve in one direction or the other will communicate all the operative cylinders to the discharge, thereby causing the gear to be in neutral, or to the pressure side, thereby causing the whole of the operative trains to be restrained and act as a transmission brake.

5. In variable speed epicyclic gearing, a plurality of operative trains of gear, a drum in each train, braking means associated with each of said drums, an operative cylinder adapted to control the braking means of each drum, and means for supplying hydraulic pressure to and releasing such pressure from said operative cylinders comprising a pump, means for connecting said pump to the oil sump of the engine, a mechanical accumulator connected to said pump, a cylinder, a grooved piston valve in said cylinder, means for controlling said valve, a pressure compartment on one side of said valve connected to said accumulator, a discharge compartment on the opposite side of said valve connected to said sump, pipe connections between said cylinder and the individual operative cylinders, a liner having a plurality of openings disposed between said cylinder and valve and adapted to place said pipe connections in communication with either the pressure or the discharge compartments, the arrangement being such that when any one of said operative cylinders is placed in communication with the pressure compartment by the rotation of the valve to a predetermined position, all the other operative cylinders communcate with the discharge compartment, and a clutch pedal adapted to effect axial movement of the piston to put all the operative cylinders in communication with the discharge and the gear in neutral.

6. A variable speed gear in which different speed ratios are obtained by compounding a plurality of epicyclic elements comprising in combination, a primary shaft, a plurality of primary sun wheels carried thereby, a plurality of planetary cages supported by and adapted to rotate on the primary shaft, planetary elements supported by said cages, secondary sun wheels carried by said cages, and two pinions integral with one another on each of said elements and having the same number of teeth but different diametrical pitch, one of them engaging a primary sun wheel and the other engaging a secondary sun wheel.

7. A variable speed gear in which different speed ratios are obtained by compounding a plurality of epicyclic elements comprising in combination, a primary shaft, a plurality of primary sun wheels carried thereby, a plurality of planetary cages supported by and adapted to rotate on the primary shaft, planetary elements supported by said cages, secondary sun wheels carried by said cages, and two pinions integral with one another on each of said elements and having the same number of teeth but different diametrical pitch, one of them engaging a primary sun wheel and the other engaging a secondary sun wheel, the drive being obtained by arresting any one of said planetary cages.

8. A variable speed gear in which different speed ratios are obtained by compounding a plurality of epicyclic elements comprising in combination, a primary shaft, a plurality of primary sun wheels carried thereby, a plurality of controlling members mounted freely upon the primary shaft, secondary sun wheels carried by said controlling members and at least one pair of integral planetary pinions carried by each controlling member, one of said pinions engaging a primary sun wheel and the other a secondary sun wheel and said pinions having the same number of teeth but different diametrical pitch and having their teeth aligned radially.

9. A variable speed and reversing gear in which different speed ratios and a reverse drive are obtained by selecting and compounding a plurality of epicyclic elements comprising in combination, a primary shaft, a plurality of primary sun wheels carried thereby, a plurality of controlling members mounted freely upon the primary shaft, secondary sun wheels carried by said controlling members and at least one pair of integral planetary pinions carried by each controlling member, one of said pinions in each pair engaging a primary sun wheel and the other a secondary sun wheel and said pinions having the same number of teeth but different diametrical pitch and having their teeth aligned radially, the desired forward or reverse drive being obtained by arresting the rotary motion of one of the said controlling members.

In testimony whereof we have signed our names to this specification.

WESTGARTH STANHOPE FORSTER BROWN.
JOSEPH MAINA.